(12) United States Patent
Lin

(10) Patent No.: US 12,388,858 B1
(45) Date of Patent: Aug. 12, 2025

(54) PREDICTING A PROBABILITY ASSOCIATED WITH AN UNEXPLOITED VULNERABILITY

(71) Applicant: Rapid7, Inc., Boston, MA (US)

(72) Inventor: Wah-Kwan Lin, Melrose, MA (US)

(73) Assignee: Rapid7, Inc., Boston, MA (US)

( * ) Notice: Subject to any disclaimer, the term of this patent is extended or adjusted under 35 U.S.C. 154(b) by 284 days.

(21) Appl. No.: 17/748,148

(22) Filed: May 19, 2022

(51) Int. Cl.
    *H04L 9/40* (2022.01)
    *G06N 7/01* (2023.01)

(52) U.S. Cl.
    CPC ........ *H04L 63/1433* (2013.01); *G06N 7/01* (2023.01)

(58) Field of Classification Search
    CPC .......... H04L 63/1433; H04L 63/1416; H04L 63/1425; H04L 63/1441; H04L 63/145; H04L 63/1491; G06N 7/01; G06N 20/00; G06N 20/10; G06N 20/20; G06F 21/577; G06F 21/56; G06F 21/561; G06F 21/562; G06F 21/563; G06F 21/564; G06F 21/565; G06F 21/566
    See application file for complete search history.

(56) References Cited

U.S. PATENT DOCUMENTS

| | | | | |
|---|---|---|---|---|
| 7,890,869 B1* | 2/2011 | Mayer | ............ | G06F 21/577 |
| | | | | 709/224 |
| 10,650,150 B1* | 5/2020 | Rajasooriya | ......... | G06N 7/01 |
| 11,328,068 B1* | 5/2022 | Niedzwiedz | .......... | G06F 21/564 |
| 11,892,897 B2* | 2/2024 | Shakarian | ............ | G06F 18/2148 |
| 2008/0005555 A1* | 1/2008 | Lotem | ..................... | G06F 21/55 |
| | | | | 713/150 |
| 2014/0007241 A1* | 1/2014 | Gula | ...................... | H04L 67/10 |
| | | | | 726/25 |
| 2014/0013434 A1* | 1/2014 | Ranum | ................. | G06F 21/564 |
| | | | | 726/24 |
| 2014/0366140 A1* | 12/2014 | Chen | ...................... | G06F 21/577 |
| | | | | 726/25 |
| 2017/0061133 A1* | 3/2017 | Trabelsi | ................ | G06F 16/951 |
| 2018/0136921 A1* | 5/2018 | Pfleger de Aguiar | ... | G06N 7/01 |
| 2020/0244691 A1* | 7/2020 | Veeramany | ......... | H04L 63/0236 |
| 2021/0264035 A1* | 8/2021 | Gitelman | ................ | G06N 5/04 |
| 2022/0100868 A1* | 3/2022 | Tarrant | ................... | G06N 20/00 |
| 2022/0164277 A1* | 5/2022 | Menashe | ............ | G06F 11/3688 |
| 2022/0201014 A1* | 6/2022 | Saha | .................. | H04L 63/1425 |
| 2022/0215102 A1* | 7/2022 | Shakarian | ............ | G06F 21/577 |
| 2022/0407891 A1* | 12/2022 | Albanese | ............. | H04L 63/205 |
| 2023/0422039 A1* | 12/2023 | Saha | ...................... | G06N 20/20 |

* cited by examiner

*Primary Examiner* — Techane Gergiso
(74) *Attorney, Agent, or Firm* — Ashwin Anand

(57) ABSTRACT

A server determines vulnerabilities associated with components of a computing device. The server determines attributes associated with individual vulnerabilities. The server determines a subset of the vulnerabilities that includes unexploited vulnerabilities. The server executes a machine learning model to predict a probability of an exploit being created for a particular unexploited vulnerability in the subset. The server sends to a device: information identifying the particular unexploited vulnerability, particular attributes associated with the particular unexploited vulnerability, and the probability of an exploit being created for the particular unexploited vulnerability.

20 Claims, 6 Drawing Sheets

PREDICTING A PROBABILITY ASSOCIATED WITH AN UNEXPLOITED VULNERABILITY

BACKGROUND

Many companies operate private computer networks that are connected to public networks such as the Internet. While such connections allow company users to easily access resources on the public networks, they also create vulnerabilities in the company network. For example, company users may unwittingly download malicious content (e.g., data, files, applications, programs, etc.) onto the company network from untrusted sources on the Internet. As another example, interactions of company users with the public network may provide opportunities for malicious actors to attack the company network. A malicious actor can plant spyware, viruses, or other types of malicious software in a company's private network though a variety of interactive means, in order to steal sensitive information from the company or even gain control of the company's computing systems. As a result, enterprise security systems have become increasingly important to protect company networks against these types of vulnerabilities.

Some in the cybersecurity community identify vulnerabilities associated with computing devices. The vulnerabilities may be present in hardware, software (including firmware), or both. Merely identifying the existence of a vulnerability does not mean that the vulnerability has been exploited. Some vulnerabilities may eventually get exploited, while other vulnerabilities may not get exploited. Currently, there is no mechanism for assessing the likelihood that a vulnerability may get exploited.

SUMMARY OF THE DISCLOSURE

This Summary provides a simplified form of concepts that are further described below in the Detailed Description. This Summary is not intended to identify key or essential features and should therefore not be used for determining or limiting the scope of the claimed subject matter.

In some examples, a server determines a plurality of vulnerabilities associated with one or more components of a computing device. The server determines one or more attributes associated with individual vulnerabilities of the plurality of vulnerabilities. The server determines a subset of the plurality of vulnerabilities that includes unexploited vulnerabilities. The server executes a machine learning model to predict a probability of an exploit being created for a particular unexploited vulnerability in the subset. The server sends to a device: information identifying the particular unexploited vulnerability, one or more particular attributes associated with the particular unexploited vulnerability, and the probability of an exploit being created for the particular unexploited vulnerability.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
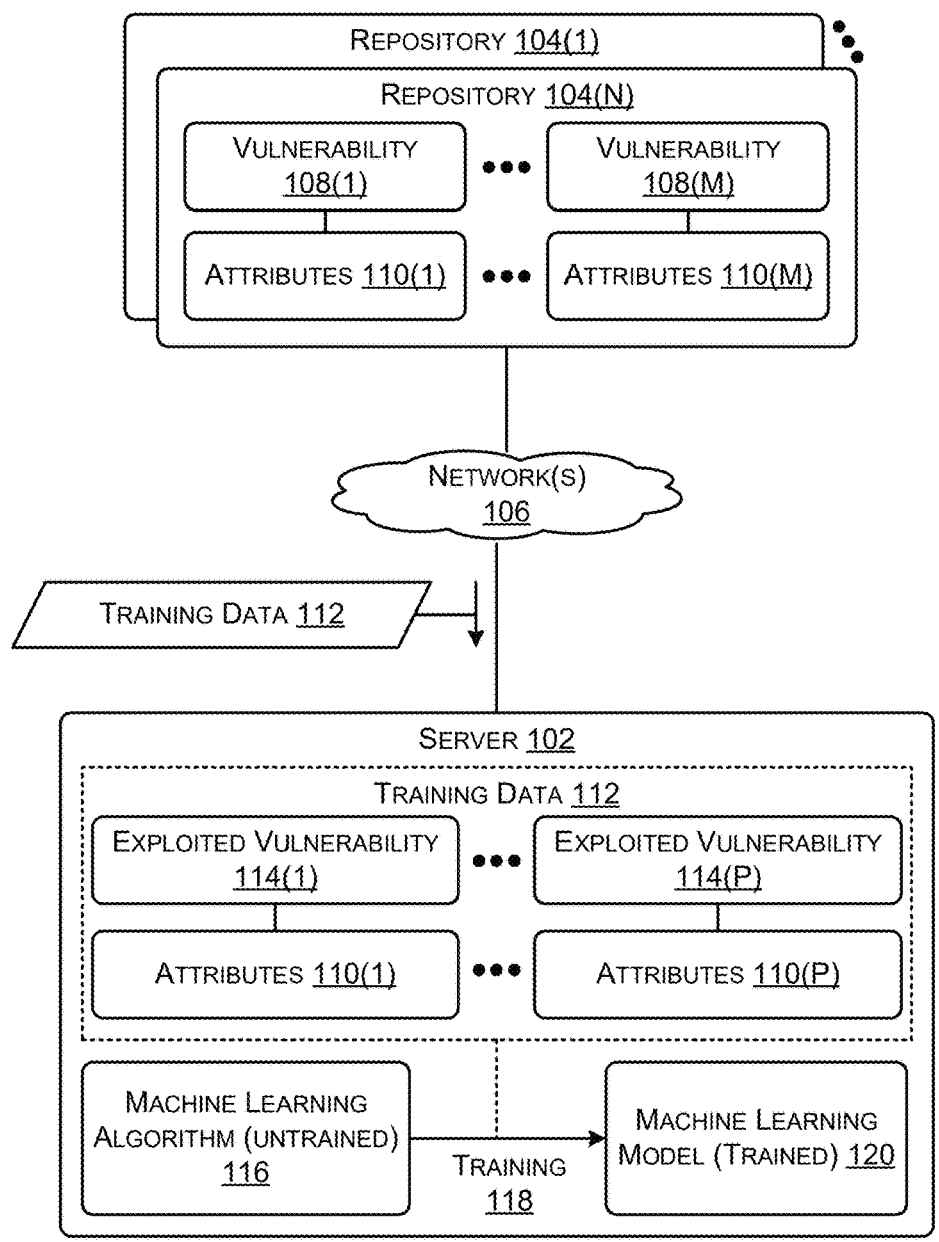
FIG. 1 is a block diagram of a system to train a machine learning algorithm to predict a likelihood that a vulnerability may be exploited, according to some embodiments.

In the cybersecurity community, entities such as the Department of Homeland Security's Cybersecurity and Infrastructure Security Agency (DHS CISA) maintain repositories of information about vulnerabilities (Known Exploited Vulnerabilities (KEV)), including vulnerabilities that are known to have been exploited. Another repository is MITRE corporation's Common Vulnerabilities and Exposures (CVE) list of publicly disclosed information security vulnerabilities and exposures that identifies and categorizes vulnerabilities in software and firmware. The CVE list currently includes information about almost 200,000 vulnerabilities. A vulnerability is a defect that provides an attacker (e.g., an unauthorized user) a way to gain control of a computing device. An exploit is software, data, or a sequence of commands that takes advantage of the vulnerability to cause unintended or unanticipated behavior to occur on the computing device, such as enabling an attacker to gain control of the computing device, enabling the attacker to gain high-level privileges, cause a denial-of-service (DOS) attack, or the like. Even if CISA identifies the vulnerabilities that have been exploited, it is quite likely that more vulnerabilities have been exploited but users (and CISA) are unaware that the vulnerabilities have been exploited. Thus, CISA's data as to which vulnerabilities have been exploited is not 100% reliable.

The attributes associated with a vulnerability include references to publicly disclosed cases of exploits of identified vulnerabilities, details around known exploit code or kits that may be applied to exploit particular vulnerabilities, or both. The nature of the data is inherently one-class, in that the data collected is of vulnerabilities that have already been exploited. In such data repositories, there may not be details of the absence of an exploit for particular vulnerabilities. Thus, the data may not identify vulnerabilities that have not been exploited. Because the data is one-class, conventional machine learning (ML), e.g., artificial intelligence (AI) classification techniques that use two or more classes of data for training, such as logistic regression method, may not be applicable. The system and techniques described herein train a machine learning model to make predictions regarding vulnerabilities using one-class training techniques. Instead of the machine learning model discriminating between two or more classes, the machine learning model described herein determines when an observation is sufficiently similar to a specific class of data (e.g., vulnerabilities known to be exploited) to make an assertion that the observation is effectively the same. For exploit prediction, the machine learning model is trained to determine when a particular vulnerability is sufficiently similar to other known vulnerabilities that have been exploited (e.g., rather than being trained to classify a particular vulnerability into two vulnerability classes, such as exploited and not exploited).

For example, in some cases, the machine learning model may be implemented as a single-class support vector machine (SVM), to determine a probability that a particular vulnerability is likely to be exploited. Such a machine learning model is applicable even in cases where there is no publicly known case of an exploit for the particular vulnerability or there is no known exploit kit for the particular vulnerability. Of course, other machine learning models may be used to perform similar predictions, such as, for example, unsupervised clustering, such as k-means clustering, or artificial intelligence techniques, such as an artificial neural network, to determine whether a particular vulnerability that has not yet been exploited looks similar to other vulnerabilities that are known to be exploited. The artificial neural network may use supervised learning, unsupervised learning, reinforcement learning, self-learning, or any combination thereof. The system and techniques described herein label vulnerabilities as exploitable, even in the absence of (1) known exploits or (2) tool kits to facilitate the exploits.

In a data collection phase, data associated with vulnerabilities, including attributes associated with the vulnerabilities, is gathered. Each attribute may include details associated with each vulnerability, such as the operating system(s) (e.g., Windows, Mac, IOS, Android, Linux, or the like), operating system version (e.g., Windows 10, Windows 11, or the like), a type of application (e.g., word processor, web browser, spread sheet, or the like) that may include the vulnerability, the attack vectors (e.g., an attack vector is the path that an attacker uses to exploit a vulnerability), network access details, and the like. Network access details indicate (1) whether the exploit is a remote exploit that works over a network and exploits a security vulnerability without any prior access to a device (or system) or (2) whether the exploit is a local exploit that uses prior access to the device (or system) to increase the privileges of the attacker running the exploit beyond the privileges granted by the system administrator. Some types of applications may be vulnerable to an exploit that causes the application to contact a hacker's server, resulting in the hacker's server sending an exploit to the application. For example, browser exploits are a common type of application exploit. The attributes associated with the vulnerabilities may include information from the Common Vulnerabilities and Exposures (CVE) system, a score from the Common Vulnerability Scoring System (CVSS), details underlying the CVSS score (e.g., attributes such as attack vectors and network access), and other details. Other sources of data may include vulnerability-related knowledge bases (KBs), such as, for example, AttackerKB.

After collecting data associated with vulnerabilities, a set of those vulnerabilities that are known to be exploited may be identified. The information as to which vulnerabilities are known to be exploited may be determined using, for example, the DHS CISA Known Exploited Vulnerabilities (KEV) database and other similar databases. Using the set of known exploited vulnerabilities, the associated attributes of the known exploited vulnerabilities are determined.

In a training phase, the collected data (e.g., the vulnerabilities known to be exploited and their associated attributes) is used as training data to train a machine learning model (e.g., a one-class support vector machine, an unsupervised clustering model, a hierarchical clustering model, an artificial neural network, a convolutional neural network, or similar). In this way, the machine learning model is trained using the attributes associated with exploited vulnerabilities and used to predict the probability that an unexploited vulnerability may be exploited. For example, the machine learning model may compare the attributes of an unexploited vulnerability with the attributes of the attributes of exploited vulnerabilities to predict the probability that the unexploited vulnerability may be exploited.

In a prediction phase, the trained machine learning model is used to analyze the data associated with vulnerabilities that are not known to be exploited to predict the probability that an exploit will be created to attack the unexploited vulnerability. The output of the trained machine learning model is prediction associated with each unexploited vulnerability. The prediction may be expressed as a numerical value (e.g., a fraction between 0 and 1, a percentage between 0 and 100, or another numerical scale in which a higher value indicates a greater probability of exploitation than a lower value) or in binary form (e.g., Yes or No, True or False, or another type of binary output).

After the trained machine learning model makes a prediction about an unexploited vulnerability, the prediction is provided to a system administrator, such as an information technology (IT) specialist or a security administrator. The system administrator may perform one or more actions to prevent the unexploited vulnerability from being exploited. For example, the system administrator may look to a software provider or hardware provider for a fix, such as an update or a patch, that addresses the vulnerability and reduces or eliminates the ability of an attacker to exploit the vulnerability. Often, in an Enterprise (e.g., a large corporation), software and/or hardware fixes are deployed slowly and cautiously. For example, a system administrator in an Enterprise may perform extensive testing of fix to determine whether the fix introduces other issues (e.g., a different type of vulnerability or prevents software or hardware working normally) to prevent a large number of devices in the Enterprise from having issues caused by the fix. To illustrate, an operating system provider may provide over a hundred fixes in a particular time period but the Enterprise may only deploy 5 to 10 of the fixes. The system administrator may use the probability predicted for individual unexploited vulnerabilities to identify, test, and deploy the fixes that address unexploited vulnerabilities with a high probability (e.g., a probability greater than a threshold amount), e.g., >50%, >60%, >70%, >80%, >90%, >95%, or the like. The machine learning model may predict a numerical probability and the system administrator may convert it into a binary determination (e.g., deploy fix if probability satisfies a threshold, don't deploy if probability fails to satisfy the threshold). In this way, the system administrator can spend time deploying fixes to prevent the majority (e.g., N % or greater, N>0) of possible exploits from taking advantage of the vulnerabilities.

The probability provided by the machine learning model for each vulnerability enables an administrator in an IT department to decide which fixes are most urgent and deploy those before deploying other fixes. The system administrator may take into consideration how much use the application that includes the vulnerability is used. For example, a fix addressing a medium or high probability vulnerability that is in an application that is used by 90% of users in the Enterprise may be deployed before a fix for a high probability vulnerability that is in an infrequently used application (e.g., used by 10% of users). In this way, the system administrator can determine the most "bang for the buck" and deploy those fixes that address vulnerabilities having a probability that satisfies a first threshold and is present in an application used by a percentage of users in the Enterprise that satisfies a second threshold. In some cases, the trained machine learning model may create a risk score for each computing device in the Enterprise based on the installed applications and the vulnerabilities associated with each installed application. For example, a first computing device may have a low risk score because the applications installed have lower probability vulnerabilities while a second computing device may have a higher risk score because the applications installed have higher probability vulnerabilities. The probability of each vulnerability may be used to create a risk score. For example, assume a computing device has a 1st app and a 2nd app. The 1st app has a 1st vulnerability with a 90% probability and a 2nd vulnerability with a 50% probability. The 2nd app has a vulnerability with a 75% probability. In this example, the risk score for the first computing device may be determined as:

risk score=90+50+75=215

A second computing device may have the 2nd app installed but not the 1st app. The risk score of the second computing device may be determined as:

risk score=75

As a first example, a method includes determining, by one or more processors, a plurality of vulnerabilities associated with individual components of a computing device. The individual components of the computing device comprise: an operating system installed on the computing device, an application installed on the computing device, a firmware of a hardware component included in the computing device, or any combination thereof. The method includes determining, by the one or more processors, one or more attributes associated with individual vulnerabilities of the plurality of vulnerabilities. The one or more attributes include an operating system associated with the individual vulnerabilities, an operating system version associated with the individual vulnerabilities, a software application associated with the individual vulnerabilities, an attack vector associated with the individual vulnerabilities, network access details associated with the individual vulnerabilities, details of an exploit kit associated with the individual vulnerabilities, or any combination thereof. The method includes determining, by the one or more processors, a subset of the plurality of vulnerabilities that includes unexploited vulnerabilities. The method includes predicting, by a machine learning model executed by the one or more processors, a probability of an exploit being created for a particular unexploited vulnerability in the subset and sending to a device: (i) information identifying the particular unexploited vulnerability, (ii) one or more particular attributes associated with the particular unexploited vulnerability, and (iii) and the probability of an exploit being created for the particular unexploited vulnerability. The machine learning model may include a support vector machine, an unsupervised clustering algorithm, or an artificial neural network algorithm. The machine learning model is trained using: one or more exploited vulnerabilities and the one or more attributes associated with individual vulnerabilities of the one or more exploited vulnerabilities. For example, the machine learning model may determine a similarity between: (i) the one or more particular attributes associated with the particular unexploited vulnerability and (ii) the one or more attributes associated with exploited vulnerabilities and use the similarity to predict the probability. The device determines, based on the probability, to deploy a fix to address the particular unexploited vulnerability, identifies a fix to address the exploit for the particular unexploited vulnerability, and deploys the fix to one or more computing devices.

As a second example, a server includes one or more processors and one or more non-transitory computer readable media storing instructions executable by the one or more processors to perform various operations. For example, the operations include determining a plurality of vulnerabilities associated with one or more components of a computing device. For example, the plurality of vulnerabilities may be identified using one or more vulnerability repositories. The one or more components of the computing device include: (i) an operating system installed on the computing device, (ii) an application installed on the computing device, (iii) a firmware of a hardware component included in the computing device, or (iv) any combination thereof. The operations include determining one or more attributes associated with individual vulnerabilities of the plurality of vulnerabilities. The one or more attributes may include an operating system associated with the individual vulnerabilities, an operating system version associated with the individual vulnerabilities, a software application associated with the individual vulnerabilities, an attack vector associated with the individual vulnerabilities, network access details associated with the individual vulnerabilities, details of an exploit kit associated with the individual vulnerabilities, or any combination thereof. The operations include determining a subset of the plurality of vulnerabilities that includes unexploited vulnerabilities. The operations include predicting, by a machine learning model, a probability of an exploit being created for a particular unexploited vulnerability in the subset. The machine learning model may include a support vector machine, an unsupervised clustering algorithm, or an artificial neural network algorithm. The machine learning model is trained using: one or more exploited vulnerabilities and the one or more attributes associated with individual vulnerabilities of the one or more exploited vulnerabilities. The operations include sending to a device: (1) information identifying the particular unexploited vulnerability, (2) one or more particular attributes associated with the particular unexploited vulnerability, and (3) the probability of an exploit being created for the particular unexploited vulnerability.

As a third example, a device includes one or more processors and one or more non-transitory computer readable media storing instructions executable by the one or more processors to perform various operations. In some cases, the operations may be performed by an anti-virus software application installed on the device. The operations include receiving a prediction including a predicted probability of an exploit being created for an unexploited vulnerability associated with a component of a computing device. The predicted probability of the exploit being created for the unexploited vulnerability is predicted by a machine learning model that is trained using data associated with a plurality of exploited vulnerabilities and attributes associated with individual exploited vulnerabilities of the plurality of exploited vulnerabilities. The machine learning model may be implemented as a support vector machine, an unsupervised clustering algorithm, or an artificial neural network algorithm. The prediction includes one or more predicted attributes associated with the exploit, such as an operating system associated with the exploit, an operating system version associated with the exploit, a software application associated with the exploit, an attack vector associated with the exploit, network access details associated with the exploit, details of an exploit kit associated with similar vulnerabilities, or any combination thereof. The component of the computing device may include: an operating system, a software application, a firmware of a hardware component, or any combination thereof. The operations include determining that the predicted probability satisfies a probability threshold. The operations include determining that a number of computing devices that include the device component satisfies a number threshold. The operations include determining that a fix to address the unexploited vulnerability is available. The operations include deploying the fix to a plurality of computing devices.

Data Gathering Phase and Training Phase

FIG. 1 is a block diagram of a system 100 to train a machine learning algorithm to predict a likelihood that a vulnerability may be exploited, according to some embodiments. The system 100 includes a server 102 connected to multiple repositories 104(1) to 104(N) (N>0) via one or more networks 106. Each of the repositories 104, such as a representative repository 104(N), may include information about various vulnerabilities, such as a vulnerability 108(1) to a vulnerability 108(M) (M>0). The representative repository 104(N) may include attributes associated with each vulnerability. For example, the vulnerability 108(1) has associated attributes 110(1) and the vulnerability 108(M) has associated attributes 110(M).

The attributes 110(M) may include details associated with the vulnerability 108(M), such as the operating system (e.g., Windows, Mac, IOS, Android, Linux, or the like) associated with the vulnerability 108(M), the operating system version (e.g., Windows 10, Windows 11, or the like) associated with the vulnerability 108(M), a type of application (e.g., word processor, web browser, spread sheet, or the like) that may include the vulnerability 108(M), the attack vectors (e.g., an attack vector is the path that an attacker uses to exploit a vulnerability) associated with the vulnerability 108(M), network access details, and the like. Network access details indicate (1) whether the exploit is a remote exploit that works over the network 106 and exploits a security vulnerability without any prior access to a device (or system) or (2) whether the exploit is a local exploit that uses prior access to the device (or system) to increase the privileges of the attacker running the exploit beyond the privileges granted by the system administrator. Some types of applications may be vulnerable to an exploit that causes the application to contact a hacker's server, resulting in the hacker's server sending an additional exploit to the application. For example, browser exploits are a common type of application exploit. The attributes 110 associated with the vulnerabilities may include information from the Common Vulnerabilities and Exposures (CVE) system, a score from the Common Vulnerability Scoring System (CVSS), details underlying the CVSS score (e.g., attributes such as attack vectors and network access), and other details. Other sources of data included in the attributes 110 may include vulnerability-related knowledge bases (KBs), such as, for example, AttackerKB.

The server 102 may collect training data 112 from the repositories 104. The training data 112 may include vulnerabilities 114(1) to 114(P) (M>P>0) that have been exploited and their associated attributes 110. Thus, the training data 112 is a subset of the vulnerabilities 108 (and associated attributes 110) from the repositories 104 because the training data 112 includes the vulnerabilities 114 that have been exploited and does not include the vulnerabilities 108 that have not been exploited.

Machine learning algorithm 116 (e.g., untrained) undergoes training 118 using the training data 112 to create machine learning model 120. Thus, the training data 112 (e.g., the exploited vulnerabilities 114 and their associated attributes 110) is used to train the machine learning algorithm 116. For example, the machine learning algorithm 116 may be a one-class support vector machine, an unsupervised clustering algorithm, a hierarchical clustering algorithm, an artificial neural network algorithm, a convolutional neural network algorithm, or similar type of machine learning algorithm. In this way, the machine learning algorithm 116 is trained using the attributes 110 associated with the exploited vulnerabilities 114 to make predictions, such as predicting the probability that an unexploited vulnerability may be exploited. For example, the machine learning model 120 may compare the attributes of an unexploited vulnerability with the attributes of the attributes 110 of exploited vulnerabilities 114 to predict the probability that the unexploited vulnerability may be exploited.

The machine learning algorithm 116 may be periodically (e.g., at a predetermined time interval) re-trained using additional training data 112. For example, the training data 112 may be gathered every T months (T>0) and may include additional vulnerabilities that were added to the one or more of the repositories 104 (e.g., after the previous training 118 was performed). In this way, the machine learning model 120 may be kept up to date.

Thus, data associated with vulnerabilities, including attributes associated with the vulnerabilities, is gathered. Each attribute may include details associated with each vulnerability, such as the operating system(s), operating system versions, a type of application that may include the vulnerability, the attack vectors, network access details, information from the CVE system, a score from the CVSS, details underlying the CVSS score, and other details. After collecting data associated with vulnerabilities, a subset of those vulnerabilities that are known to be exploited is identified, e.g., using the DHS CISA Known Exploited Vulnerabilities (KEV) database and other similar databases. The set of known exploited vulnerabilities includes their associated attributes. The vulnerabilities known to be exploited and their associated attributes are used as training data to train a machine learning model (e.g., a one-class support vector machine, an unsupervised clustering model, a hierarchical clustering model, an artificial neural network, a convolutional neural network, or similar) to predict the probability that an unexploited vulnerability may be exploited. For example, the machine learning model is trained to determine when an unexploited vulnerability is sufficiently similar to known exploited vulnerabilities.

Prediction Phase

Figure 2:
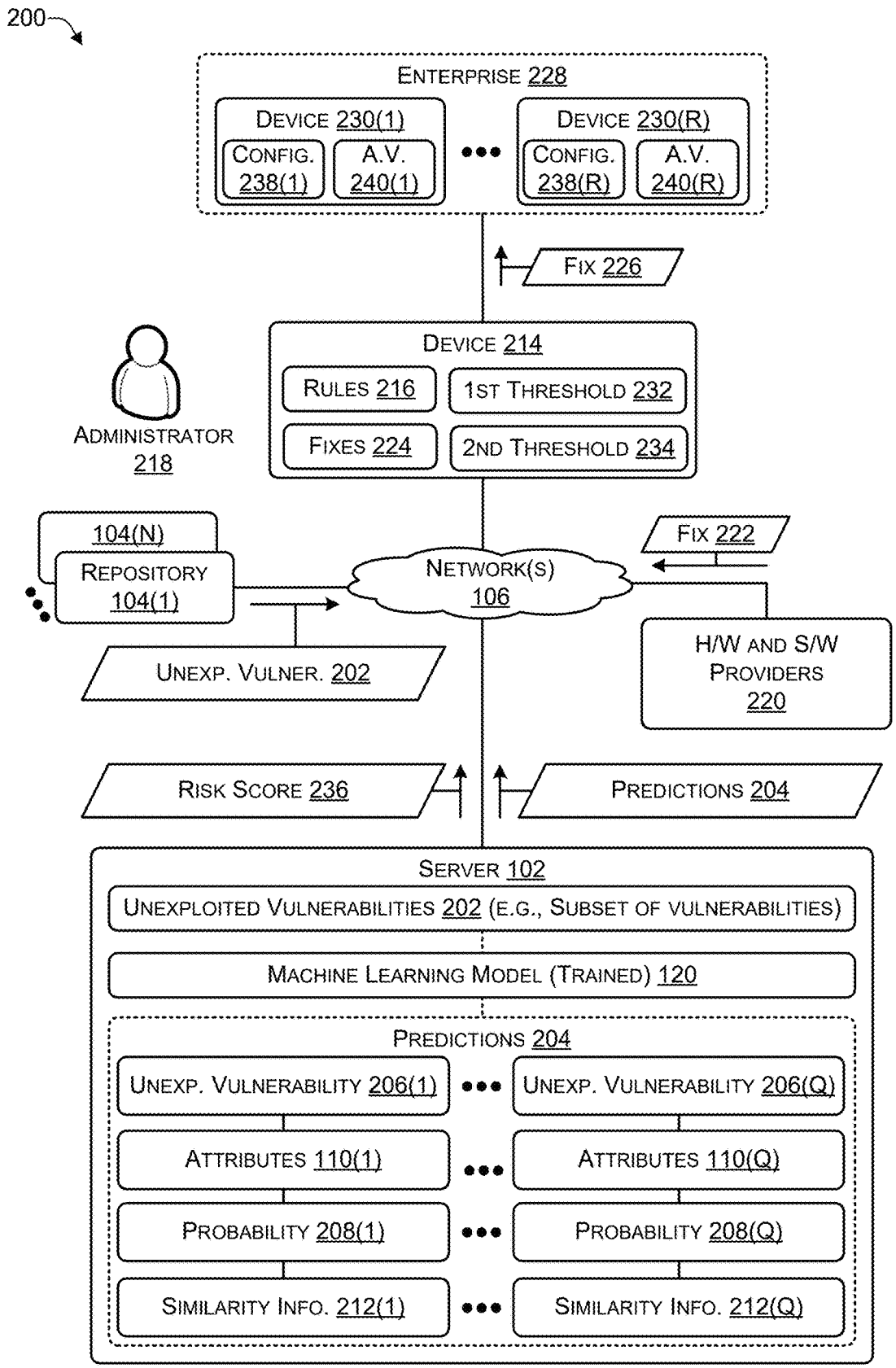
FIG. 2 is a block diagram of a system to use a machine learning algorithm to predict a likelihood that a vulnerability may be exploited, according to some embodiments.

FIG. 2 is a block diagram of a system 200 to use a machine learning algorithm to predict a likelihood that a vulnerability may be exploited, according to some embodiments. In the prediction phase, the machine learning model (trained) 120 is used to analyze unexploited vulnerabilities 202 (e.g., vulnerabilities that are known to exist but an exploit associated with the individual vulnerabilities is not known to exist) to make predictions 204. The predictions 204 include information identifying unexploited vulnerabilities 206(1) to 206(Q) (0<Q<M) and their associated probabilities 208(1) to 208(Q). Each of the probabilities 208 indicates a probability (e.g., likelihood) that an exploit will be created to attack the unexploited vulnerability 206. The probabilities 208 may each be expressed as a numerical value (e.g., a fraction between 0 and 1, a percentage between 0 and 100, or another numerical scale in which a higher value indicates a greater probability of exploitation than a lower value) or in binary form (e.g., Yes or No, True or False, or another type of binary output). Of course, if the probabilities 208 are numerical values, the probabilities 208 may be converted to binary form using a threshold, e.g., a numerical value satisfying a threshold (e.g., 50% or more) indicates a high probability while a numerical value that fails to satisfy the threshold indicates a low probability. In some cases, the machine learning model 120 may provide similarity information 212 indicating a similarity of each of the unexploited vulnerabilities 206 to one or more of the exploited vulnerabilities 114 of FIG. 1. For example, the similarity between an unexploited vulnerability 206 and one of more of the exploited vulnerabilities 114 may be expressed using a Jaccard index, a simple matching coefficient, a Hamming distance, a Sorensen-Dice coefficient, a Tversky index, or a Tanimoto distance.

After the machine learning model 120 makes the predictions 204 about the unexploited vulnerabilities 206, the predictions 204 may be provided to a device 214 associated with an administrator 218 (e.g., system administrator), such as an information technology (IT) specialist, a security administrator, or similar. The administrator 218 may perform actions to prevent one or more of the unexploited vulnerabilities 202 from being exploited. For example, the administrator 218 may create rules 216 to determine which fixes 224 are automatically (without human interaction) deployed to devices 230(1) to 230(R) (R>0) in an enterprise 228. For example, in response to becoming aware of a vulnerability in a product, hardware and software providers 220 may release fixes, such as a representative fix 222. The administrator 218 may store the fix 222 in a collection of fixes 224. Each of the fixes 224 may be a patch, a software and/or firmware update, or other type of code designed to address one or more of the unexploited vulnerabilities 202 and reduces or eliminates the ability of an attacker to exploit the unexploited vulnerabilities 202.

For the devices 230 in the enterprise 228 (e.g., a large corporation), the fixes 224 may be deployed slowly and cautiously. For example, the administrator 218 may perform extensive testing of each of the fixes 224, such as the fix 226, to determine whether the fix 226 introduces another issue (e.g., a different type of vulnerability, prevents software or hardware from working normally, or another type of issue). By doing extensive testing prior to deploying the fix 226 to the enterprise 228, the administrator 218 may prevent one or more of the devices from having issues caused by the fix 226. For example, a software (e.g., operating system, productivity application) provider may provide about a thousand fixes in a year but the administrator 218 may deploy a fraction (e.g., 10 to 15) of the fixes.

In the system 200, the administrator 218 may create the rules 216 to determine, based on the probability 208 associated with each of the unexploited vulnerabilities 206, which of the fixes 226 address unexploited vulnerabilities with a high probability (e.g., a probability greater than a threshold amount, such as >50%, >60%, >70%, >80%, >90%, >95%, or the like). In some cases, the machine learning model 120 may predict a numerical probability (e.g., the probabilities 208) and the rules 216 may convert the probabilities 208 into a binary determination (e.g., deploy fix if probability satisfies a threshold, don't deploy if probability fails to satisfy the threshold). In this way, the administrator 216 can create the rules 216 to automatically deploy at least a portion of the fixes 224 to address vulnerabilities in the devices 230 that are predicted to have a high probability of occurring.

In some cases, an anti-virus (A.V.) software application 240 may include the rules 216. The rules 216 may be provided by and regularly updated by a manufacturer of the A. V. 240. For example, the A.V. 240 may be installed in each of the devices 230 and may determine the configuration 238. Based on the configuration 238, the A. V. 240 may determine whether to apply a particular fix, such as the representative fix 222, to a particular one of the devices 230. In this way, the A. V. 240 may selectively apply fixes, such as the representative fix 222, based on the configuration 238 and the probabilities 208 associated with each of the unexploited vulnerabilities 206. For example, if the configuration 238(R) indicates that a component (e.g., hardware, firmware, software application, operating system, or the like) of the device 230(R) has a vulnerability with a high probability of being exploited, then the A. V. 240 may query the hardware and software providers 220 to identify a fix, such as the fix 222, and apply the fix to the device 230(R). The A. V. 240 may be deployed in the Enterprise 228, in individual devices (e.g., of a retail customer), or both.

The probabilities 208 associated with each of the unexploited vulnerabilities 206 enables the administrator 218 (e.g., in an information technology (IT) department) to create the rules 216 to determine which of the fixes 224 to deploy and in what order to deploy the fixes 224. The administrator 218 may create the rules 216 that take into account how many of the devices 230 have a particular application (that includes the vulnerability) installed, what percentage of time the particular application is used, and so on. For example, the fix 226 may have a medium or higher probability (e.g., 50% or more) associated with a vulnerability that is in an application that is used by 90% of the devices 230. In this example, the fix 226 may be deployed before others of the fixes 224 because the application (that includes the vulnerability) is used by 90% of the devices 230. To illustrate, the fix 226 may be deployed before others of the fixes 224 are deployed because the fix 226 addresses a high probability vulnerability in an application used by a large percentage of the devices 230. In this way, the administrator 218 is able to design the rules 216 to provide the most "bang for the buck" and deploy those of the fixes 224 that address the unexploited vulnerabilities 206 having a probability 208 that satisfies a first threshold 232 and is present in a computer component (e.g., operating system, application, or the like) that is used by a percentage of the devices 230 that satisfies a second threshold 234. In some cases, the machine learning model 120 may create a risk score 236 for each computing device 230 in the Enterprise 228 based on each device's configuration 238. Each of the configurations 238 may identify information associated with hardware and software components of the associated device 230. The probability 208 of each unexploited vulnerability 206 may be used to create a risk score. For example, the configuration 238(R) associated with the device 230(R), may identify the hardware included in the device 230(R), firmware versions installed in the device 230(R), an operating system and associated version installed in the device 230(R), installed applications and their associated versions in the device 230(R), and other information associated with the device 230(R). For example, the device 203(1) may have a low risk score because the installed applications have lower probability vulnerabilities while the device 230(R) may have a higher risk score because the installed applications have higher probability vulnerabilities. To illustrate, assume the device 230(1) has a 1st app and a 2nd app. The 1st app has a vulnerability with a 90% probability and the 2nd app has a vulnerability with a 75% probability. In this example, the risk score for the computing device may be determined as:

risk score=90+75=165

The device 230(R) has the 2nd app installed but not the 1st app. The risk score may be determined as:

risk score=75

The devices 230 may include different types of computing resources, such as a workstation, a server, a mobile device, a virtual machine, or the like. The virtual machine may be an instance of an emulated computer that is hosted on a physical virtual machine host. The virtual machine host may implement virtualization hardware and/or software (e.g., hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. As another example, another type of virtualized execution environment is the container, which provides a portable and isolated execution environment over a host operating system of a physical host. Example implementations of container technologies include DOCKER, GOOGLE KUBERNETES, AMAZON WEB SERVICES, and MICROSOFT AZURE.

Thus, a server identifies unexploited vulnerabilities in repositories of known vulnerabilities. A machine learning model is used to predict a probability that an exploit may be created to take advantage of each unexploited vulnerabilities (e.g., a subset of known vulnerabilities). For example, the machine learning model may determine the probability of an exploit being created based on a similarity between (i) the attributes of an unexploited vulnerability and (ii) the attributes of exploited vulnerabilities. After becoming aware of a vulnerability, a provider of a computing device (or a provider of a component of the computing device) may release a fix to address the vulnerability. A system administrator (or someone with a similar role) may determine whether to deploy the fix based on the probability, how many devices may be affected by the vulnerability, the configuration of individual devices, and the like. In this way, the system administrator can deploy those fixes that address vulnerabilities for which there is a high probability that an exploit will be developed. In some cases, the system administrator may create rules stored on the administrator's device to enable the device to automatically (without human interaction) determine whether to deploy a fix to address a vulnerability. In this way, the rules may be used to deploy fixes to address high probability vulnerabilities that may affect a large number of devices while not deploying fixes that address vulnerabilities with a relatively low probability of being exploited and/or that affect a relatively small number of devices. In some cases, anti-virus software may use the rules to prioritize the installation of fixes.

Figure 3:
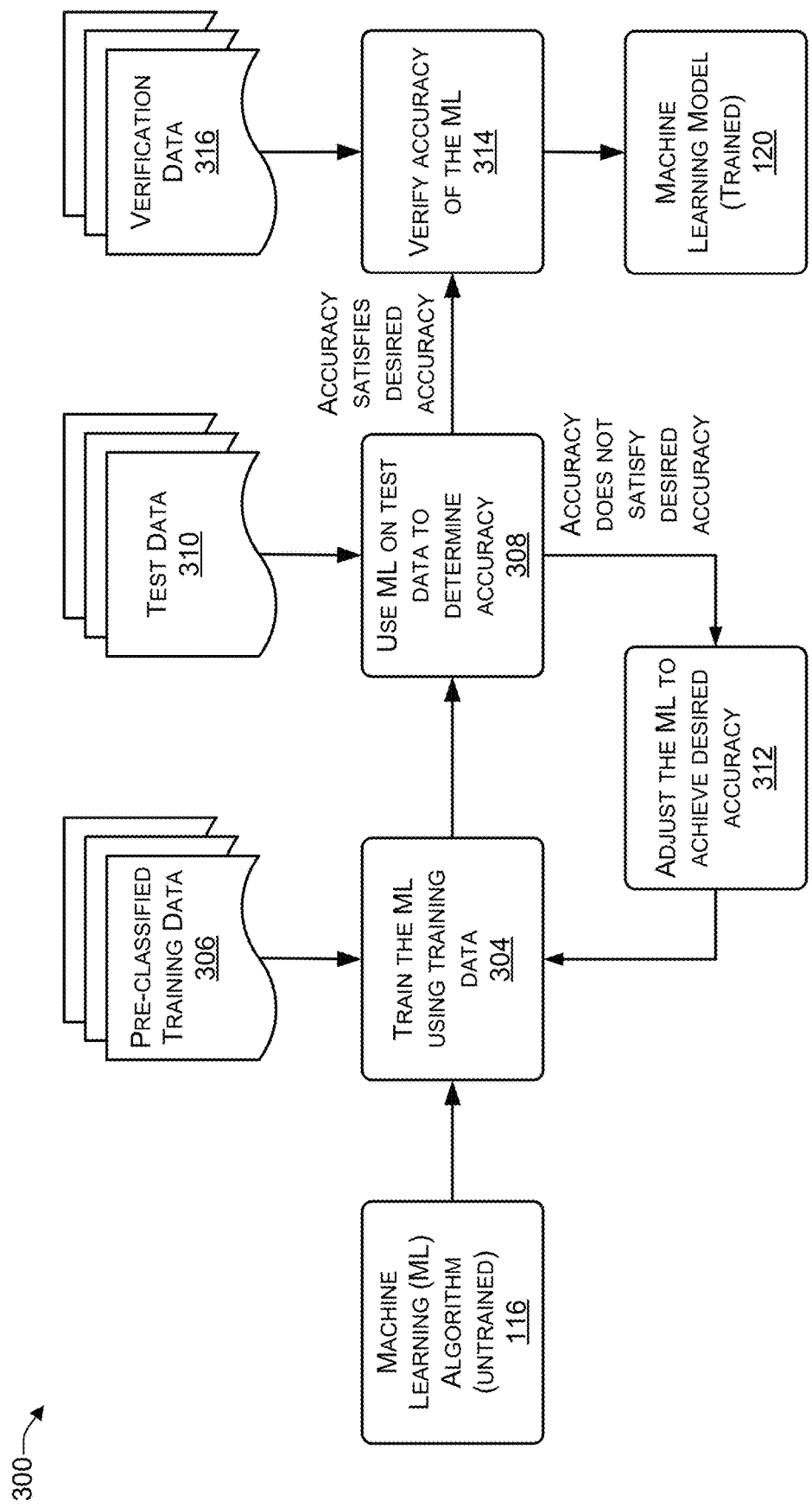
FIG. 3 is a flowchart of a process that includes training a machine learning algorithm, according to some embodiments.
Figure 4:
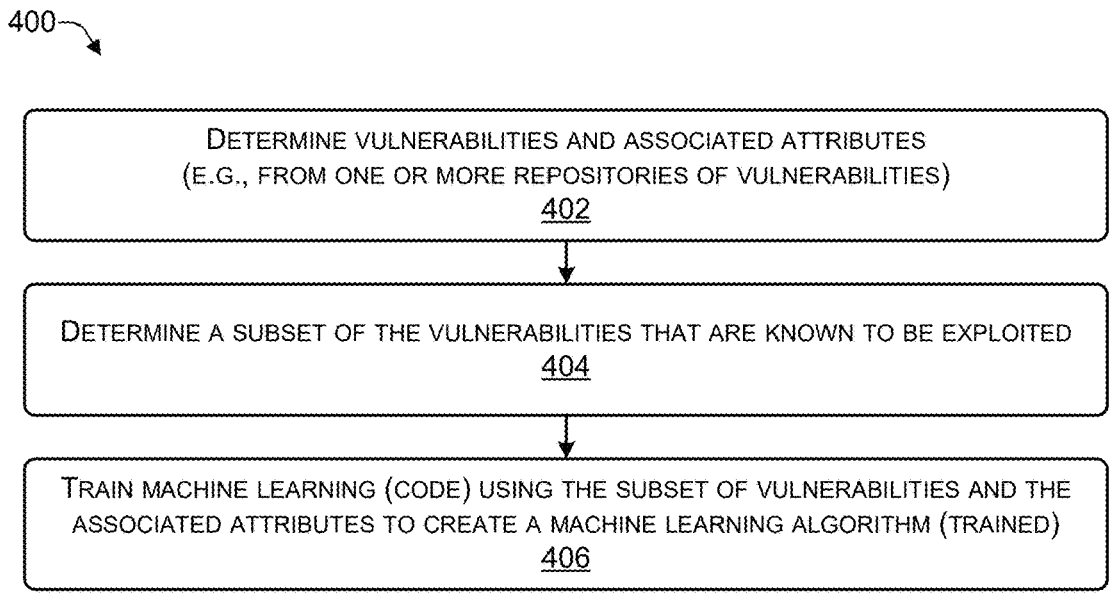
FIG. 4 is a flowchart of a process that includes training a machine learning algorithm using exploited vulnerabilities, according to some embodiments.
Figure 5:
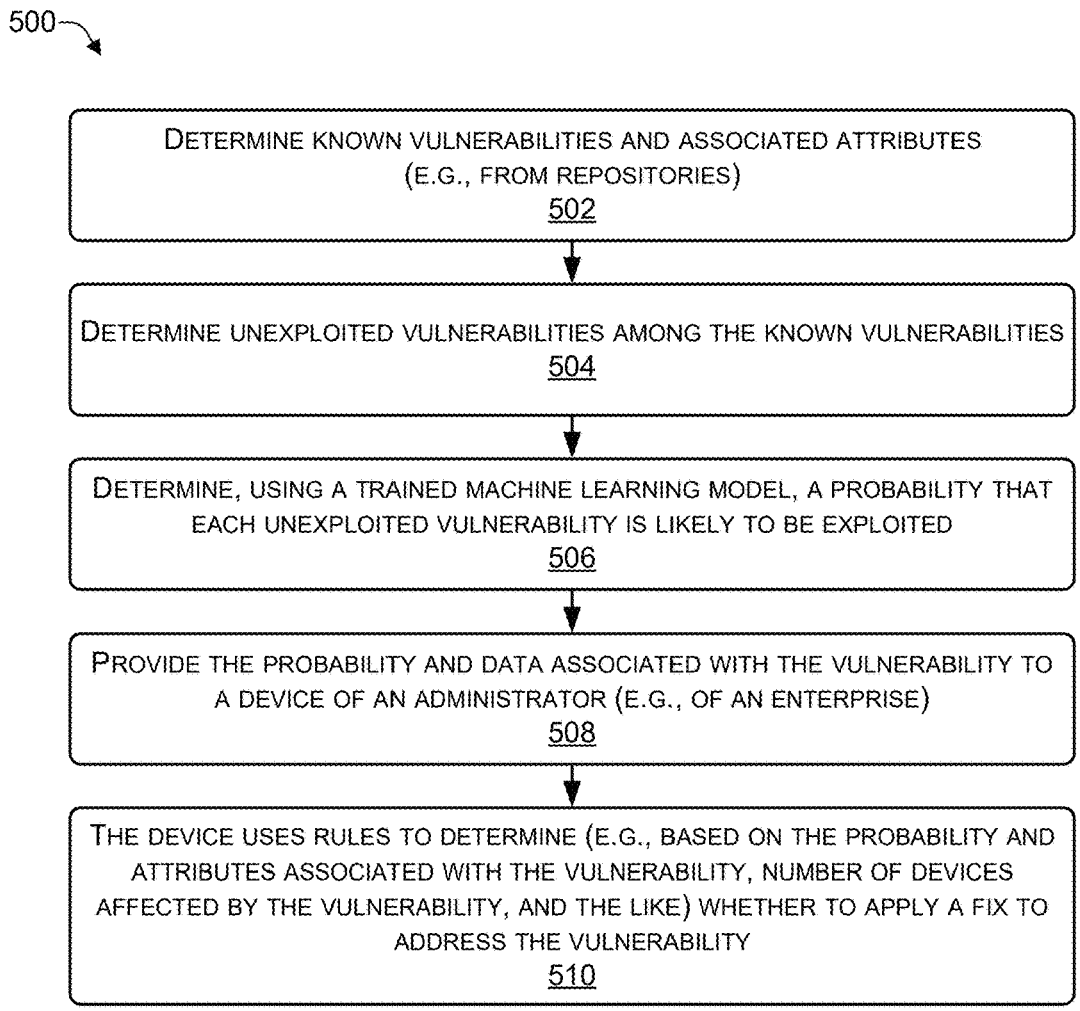
FIG. 5 is a flowchart of a process that includes predicting, using a machine learning algorithm, a probability that an unexploited vulnerability may be exploited, according to some embodiments.

In the flow diagrams of FIGS. 3, 4, and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, and 500 are described with reference to FIGS. 1 and 2, as described above, although other models, frameworks, systems and environments may be used to implement these processes.

FIG. 3 is a flowchart of a process 300 that to create a machine learning model, according to some embodiments. For example, the process 300 may be performed by the server 102 of FIG. 1.

At 302, a machine learning algorithm (e.g., software code that has not yet been trained) may be created by one or more software designers. At 304, the machine learning algorithm may be trained using pre-classified training data 306 (e.g., a portion of the training data 112 that has been pre-classified). For example, the training data 306 may have been pre-classified by humans, by machine learning, or a combination of both. After the machine learning has been trained using the pre-classified training data 306, the machine learning may be tested, at 308, using test data 310 to determine an accuracy of the machine learning. For example, in the case of a classifier, the accuracy of the classification may be determined using the test data 310.

If an accuracy of the machine learning does not satisfy a desired accuracy (e.g., 95%, 98%, 99% accurate), at 308, then the machine learning code may be modified (e.g., adjusted), at 312, to achieve the desired accuracy. For example, at 312, the software designers may modify the machine learning software code to improve the accuracy of the machine learning algorithm. After the machine learning has been tuned, at 312, the machine learning may be retrained, at 304, using the pre-classified training data 306. In this way, 304, 308, 312 may be repeated until the machine learning is able to classify the test data 310 with the desired accuracy.

After determining, at 308, that an accuracy of the machine learning satisfies the desired accuracy, the process may proceed to 314, where verification data 316 (e.g., a portion of the conversation data 136 that has been pre-classified) may be used to verify an accuracy of the machine learning. After the accuracy of the machine learning is verified, at 314, the machine learning model 120, which has been trained to provide a particular level of accuracy may be used. For example, the machine learning model 120 may be trained to make the predictions 204 of FIG. 2.

FIG. 4 is a flowchart of a process 400 that includes training a machine learning algorithm using exploited vulnerabilities, according to some embodiments. For example, the process 400 may be performed by the server 102 of FIG. 1.

At 402, the process may determine (e.g., from one or more repositories) vulnerabilities and their associated attributes. At 404, the process may determine a subset of the vulnerabilities that are known to be exploited (e.g., exploited vulnerabilities). At 406, the process may train machine learning code using the subset of vulnerabilities and the associated attributes to create a machine learning algorithm that has been trained to predict a probability that an unexploited vulnerability will be exploited. For example, in FIG. 1, the server 102 may gather the training data 112 from the repositories 104. The training data 112 may include exploited vulnerabilities 114 and their associated attributes 110. The exploited vulnerabilities 114 may be a subset of the vulnerabilities 108 included in the repositories 104. The training data 112 is used to train the machine learning algorithm 116 during the training 118 to create the machine learning model 120.

Thus, exploited vulnerabilities and their associated attributes may be identified from repositories that include known vulnerabilities and their associated attributes. The exploited vulnerabilities and their associated attributes may be used to train a machine learning algorithm to create a trained machine learning model capable of predicting a probability that an unexploited vulnerability will be exploited. In this way, vulnerabilities that have a high probability of being exploited can be identified and addressed.

FIG. 5 is a flowchart of a process 500 that includes predicting, using a machine learning algorithm, a probability that an unexploited vulnerability may be exploited, according to some embodiments. For example, the process 500 may be performed by the server 102 of FIG. 2.

At 502, the process may determine known vulnerabilities and their associated attributes (e.g., from one or more repositories). At 504, the process may determine the unexploited vulnerabilities among the known vulnerabilities. For example, in FIG. 2, the server 102 may determine the unexploited vulnerabilities 202 from the repositories 104.

At 506, the process may use a trained machine learning model to determine a probability that each unexploited vulnerability is likely to be exploited. For example, in FIG. 2, the server 102 may use the machine learning model 122 determine the probability 208 that an exploit may be created for each of the unexploited vulnerabilities 206.

At 508, the process may provide the probability and data associated with the vulnerability to a device of a system administrator (e.g., associated with an enterprise). At 510, the device may use one or more rules to determine (e.g., based on the probability associated with the vulnerability, the attributes associated with the vulnerability, which devices are affected by the vulnerability, and the like) whether to deploy a fix (to address the vulnerability) to one or more devices (e.g., in the enterprise). For example, in FIG. 2, the server 102 may provide one or more of the predictions 204 to the device 214 associated with the administrator 218. The device 214 may use the rules 216 and, in some cases, the thresholds 232, 234, to determine which of the fixes 224 to apply to the devices 230.

Thus, one or more repositories may be used to identify unexploited vulnerabilities. A machine learning model that has been trained using exploited vulnerabilities (and their attributes) may be used to predict a probability that an exploit will be created for each of the unexploited vulnerabilities. The probabilities may be provided to a device of a network administrator. The network administrator may create rules to determine which fixes to deploy to devices in an enterprise to address the unexploited vulnerabilities. For example, the rules may deploy a portion of the fixes which address vulnerabilities with a high probability and are present in a large number of the devices. In this way, the network administrator may deploy a few fixes to address high probability vulnerabilities in common and/or frequently used components (e.g., firmware, operating systems, applications, or the like) of the devices.

Figure 6:
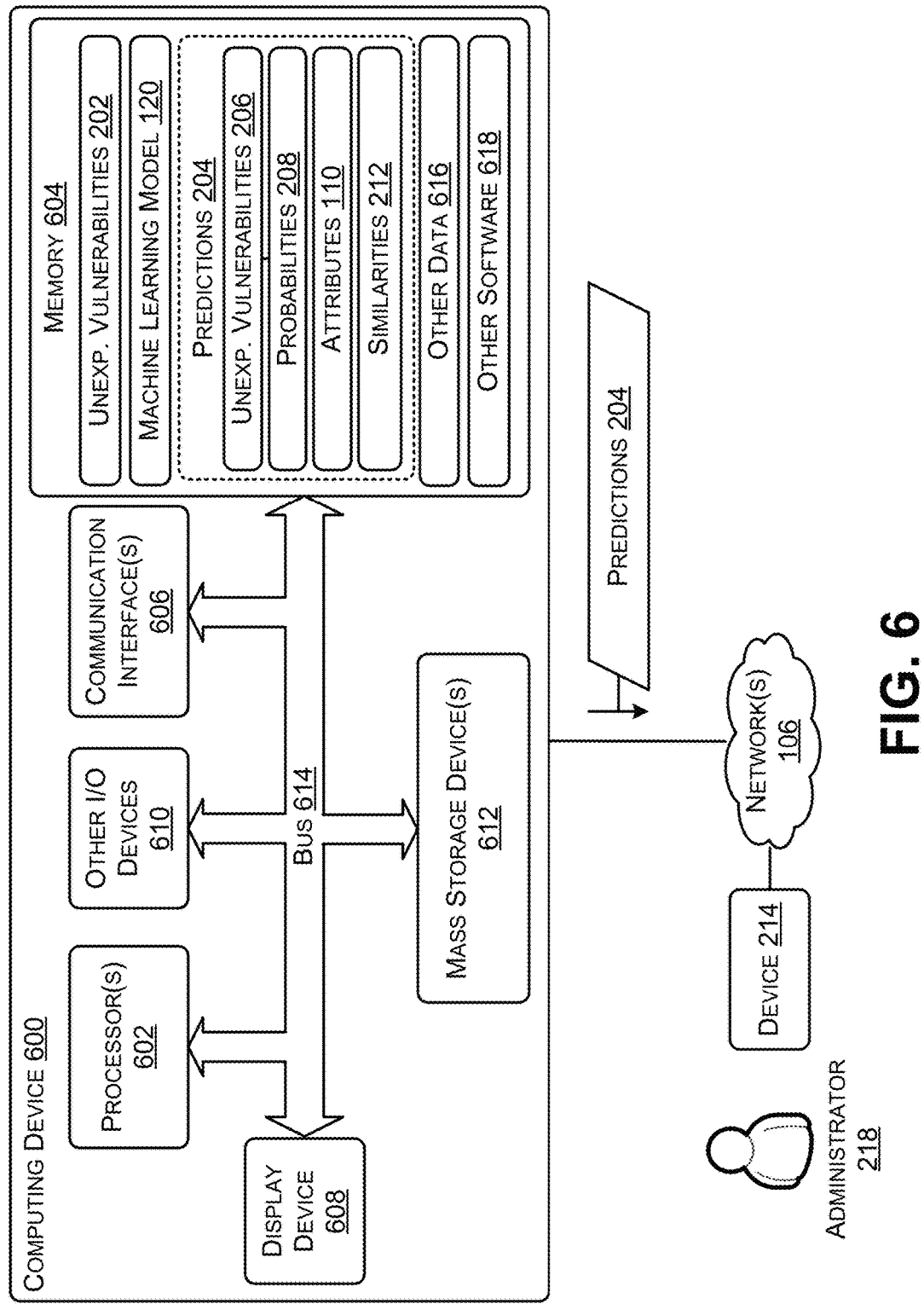
FIG. 6 illustrates an example configuration of a computing device that can be used to implement the systems and techniques described herein.

FIG. 6 illustrates an example configuration of a computing device 600 that can be used to implement the systems and techniques described herein, such as for example, the server 102 of FIGS. 1 and 2, the repositories 104 of FIGS. 1 and 2, the device 214, the devices 230, or any combination thereof. For illustration purposes, the computing device 600 is illustrated as implementing the server 102 of FIGS. 1 and 2.

The computing device 600 may include one or more processors 602 (e.g., central processing unit (CPU), graphics processing unit (GPU), or the like), a memory 604, communication interfaces 606, a display device 608, other input/output (I/O) devices 610 (e.g., keyboard, trackball, and the like), and one or more mass storage devices 612 (e.g., disk drive, solid state disk drive, or the like), configured to communicate with each other, such as via one or more system buses 614 or other suitable connections. While a single system bus 614 is illustrated for ease of understanding, it should be understood that the system buses 614 may include multiple buses, such as a memory device bus, a storage device bus (e.g., serial ATA (SATA) and the like), data buses (e.g., universal serial bus (USB) and the like), video signal buses (e.g., ThunderBolt®, digital video interface (DVI), High-Definition Multimedia Interface (HDMI), and the like), power buses, etc.

The processors 602 are one or more hardware devices that may include a single processing unit or a number of processing units, all of which may include single or multiple computing units or multiple cores. The processors 602 may include a GPU that is integrated into the CPU or the GPU may be a separate processor device from the CPU. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 are configured to fetch and execute computer-readable instructions stored in the memory 604, mass storage devices 612, and other types of non-transitory computer-readable media.

Memory 604 and mass storage devices 612 are examples of non-transitory computer storage media (e.g., memory storage devices) for storing instructions that can be executed by the processors 602 to perform the various functions described herein. For example, memory 604 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., compact disc (CD), digital versatile disc (DVD)), a storage array, a network attached storage, a storage area network, or the like. Both memory 604 and mass storage devices 612 may be collectively referred to as memory or computer storage media herein and include any type of non-transitory media capable of storing computer-readable, processor-executable program instructions as computer program code that can be executed by the processors 602 as a particular machine configured for carrying out the operations and functions described in the implementations herein.

The computing device 600 may include one or more communication interfaces 606 for exchanging data via the network(s) 106. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

The display device 608 may be used for displaying content (e.g., information and images) to users. Other I/O devices 610 may be devices that receive various inputs from a user and provide various outputs to the user, and may include a keyboard, a touchpad, a mouse, a printer, audio input/output devices, and so forth.

The computer storage media, such as memory 604 and mass storage devices 612, may be used to store software and data. For example, the computer storage media may be used to store the unexploited vulnerabilities 202, the machine learning model 120, the predictions 204, other data 616, and other software 618.

The systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
executing instructions on one or more processors to perform operations comprising:
    determining a plurality of vulnerabilities associated with individual components of a computing device;
    determining one or more attributes associated with individual vulnerabilities of the plurality of vulnerabilities;
    determining a subset of the plurality of vulnerabilities, the subset comprising unexploited vulnerabilities associated with an absence of known exploits;
    predicting, using a machine learning model executed by the one or more processors, a probability of an exploit being created for a particular unexploited vulnerability in the subset, wherein the machine learning model is a one-class model trained using one-class training data that includes one or more attributes of vulnerabilities that have known exploits;
    determine, based on probabilities of respective unexploited vulnerabilities in the subset and respective components associated with the respective unexploited vulnerabilities in the subset, a risk score of the computing device; and
    sending to a device:
        information identifying the particular unexploited vulnerability,
        one or more particular attributes associated with the particular unexploited vulnerability,
        the probability of the exploit being created for the particular unexploited vulnerability, and
        the risk score of the computing device.

2. The method of claim 1, wherein the device:
determines, based on the probability, to deploy a fix to address the particular unexploited vulnerability;
identifies a fix to address the exploit for the particular unexploited vulnerability; and
deploys the fix to one or more computing devices.

3. The method of claim 1, wherein the one or more attributes comprise:
an operating system associated with the individual vulnerabilities;
an operating system version associated with the individual vulnerabilities;
a software application associated with the individual vulnerabilities;
an attack vector associated with the individual vulnerabilities;
network access details associated with the individual vulnerabilities;
details of an exploit kit associated with the individual vulnerabilities; or
any combination thereof.

4. The method of claim 1, wherein the one or more components of the computing device comprise:
an operating system installed on the computing device;
an application installed on the computing device;
a firmware of a hardware component included in the computing device; or
any combination thereof.

5. The method of claim 1, wherein the machine learning model comprises:
a support vector machine;
an unsupervised clustering model; or
an artificial neural network.

6. The method of claim 1, wherein:
the machine learning model is trained using vulnerability attribute data of publicly disclosed vulnerabilities collected from a plurality of security vulnerability repositories.

7. The method of claim 1, wherein:
the machine learning model determines the probability based on a similarity between:
    the one or more particular attributes associated with the particular unexploited vulnerability; and
    the one or more attributes associated with exploited vulnerabilities.

8. A system server comprising:
a server comprising one or more processors; and
one or more non-transitory computer readable media storing instructions executable by the one or more processors to perform operations comprising:

determining a plurality of vulnerabilities associated with one or more components of a computing device;

determining one or more attributes associated with individual vulnerabilities of the plurality of vulnerabilities;

determining a subset of the plurality of vulnerabilities, the subset comprising unexploited vulnerabilities associated with an absence of known exploits;

predicting, using a machine learning model, a probability of an exploit being created for a particular unexploited vulnerability in the subset, wherein the machine learning model is a one-class model trained using one-class training data that includes one or more attributes of vulnerabilities that have known exploits;

determining, based on probabilities of respective unexploited vulnerabilities in the subset and respective components associated with the respective unexploited vulnerabilities in the subset, a risk score of the computing device; and sending to a device:
information identifying the particular unexploited vulnerability,
one or more particular attributes associated with the particular unexploited vulnerability,
the probability of the exploit being created for the particular unexploited vulnerability, and
the risk score of the computing device.

9. The system of claim 8, wherein the device is an administrator device associated with a network.

10. The system of claim 8, wherein the one or more components of the computing device comprise:
an operating system installed on the computing device;
an application installed on the computing device;
a firmware of a hardware component included in the computing device; or
any combination thereof.

11. The system of claim 8, wherein the machine learning model comprises:
a support vector machine;
an unsupervised clustering model; or
an artificial neural network.

12. The system of claim 8, wherein:
the machine learning model is trained using vulnerability attribute data of publicly disclosed vulnerabilities collected from a plurality of security vulnerability repositories.

13. The system of claim 8, wherein the machine learning model determines the probability based on a similarity between:
the one or more particular attributes associated with the particular unexploited vulnerability; and
the one or more attributes associated with exploited vulnerabilities.

14. The system of claim 8, wherein the one or more attributes comprise:
an operating system associated with the individual vulnerabilities;
an operating system version associated with the individual vulnerabilities;
a software application associated with the individual vulnerabilities;
an attack vector associated with the individual vulnerabilities;
network access details associated with the individual vulnerabilities;
details of an exploit kit associated with the individual vulnerabilities; or
any combination thereof.

15. The system of claim 8, wherein the system comprises the device and the device stores device instructions executable by one or more processors of the device to perform operations comprising:
receiving the probability of the exploit being created for the particular unexploited vulnerability, wherein the particular unexploited vulnerability is associated with a component of a computing device;
determining that the probability satisfies a probability threshold;
determining that a fix to address the unexploited vulnerability is available; and
deploying the fix to the computing device.

16. The system of claim 15, wherein the device instructions are executable by the device to perform:
determining that a number of computing devices in a network that include the particular component satisfies a number threshold; and
deploying the fix to a plurality of computing devices in the network.

17. The system of claim 16, wherein the device is an administrator device associated with the network.

18. The system of claim 15, wherein the device is configured to deploy a portion of the fix based on the probability of the exploit being created for the particular unexploited vulnerability.

19. The system of claim 15, wherein the device is configured to automatically select the fix from a collection of fixes based on a set of rules without human interaction.

20. The system of claim 15, wherein the set of rules are stored as part of an anti-virus software application installed on the device.

* * * * *